United States Patent
Lee et al.

(10) Patent No.: US 12,266,753 B2
(45) Date of Patent: Apr. 1, 2025

(54) APPARATUS FOR MANUFACTURING UNIT CELL

(71) Applicant: LG ENERGY SOLUTION, LTD., Seoul (KR)

(72) Inventors: Byeong Kyu Lee, Daejeon (KR); Su Taek Jung, Daejeon (KR); Soon Kwan Kwon, Daejeon (KR); Hyun Kyung Shin, Daejeon (KR); Won Nyeon Kim, Daejeon (KR); Seong Won Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 98 days.

(21) Appl. No.: 17/769,278

(22) PCT Filed: Jul. 10, 2020

(86) PCT No.: PCT/KR2020/009066
§ 371 (c)(1),
(2) Date: Apr. 14, 2022

(87) PCT Pub. No.: WO2021/117997
PCT Pub. Date: Jun. 17, 2021

(65) Prior Publication Data
US 2024/0039027 A1    Feb. 1, 2024

(30) Foreign Application Priority Data
Dec. 10, 2019  (KR) .................. 10-2019-0164067

(51) Int. Cl.
*H01M 10/04* (2006.01)
*B05C 3/12* (2006.01)
(Continued)

(52) U.S. Cl.
CPC ......... *H01M 10/0404* (2013.01); *B05C 3/125* (2013.01); *B05C 11/1039* (2013.01);
(Continued)

(58) Field of Classification Search
CPC ......... H01M 10/0404; H01M 10/0585; H01M 50/46; Y10T 29/53135
(Continued)

(56) References Cited

U.S. PATENT DOCUMENTS

| 5,778,515 A | 7/1998 | Menon |
|---|---|---|
| 6,337,101 B1 | 1/2002 | Gozdz |

(Continued)

FOREIGN PATENT DOCUMENTS

| CN | 107534116 A | 1/2018 |
|---|---|---|
| CN | 108028414 A | 5/2018 |

(Continued)

OTHER PUBLICATIONS

Extended European Search Report for European Application No. 20899460.8, dated Apr. 13, 2023.
(Continued)

*Primary Examiner* — Thiem D Phan
(74) *Attorney, Agent, or Firm* — Birch, Stewart, Kolasch & Birch, LLP

(57) ABSTRACT

A method of manufacturing a unit cell having a negative electrode, a separator, and a positive electrode are stacked and placed between guide rollers. One of the positive electrode and the negative electrode. The separator is coated with a binder, and the separator is dipped in a solvent to soften a cured binder before the separator is put between the guide rollers. An apparatus for manufacturing a unit cell includes a reservoir in which at least two or more transfer rollers that rotate while the separator passes therethrough are mounted, and a solvent is stored at a predetermined level;
(Continued)

and a chamber into which the separator passing through a reservoir is put together with the positive electrode and the negative electrode. Guide rollers are disposed so that the negative electrode and the positive electrode move to both surfaces of the separator, respectively.

11 Claims, 6 Drawing Sheets

(51) Int. Cl.
 *B05C 11/10* (2006.01)
 *H01M 10/0585* (2010.01)
 *H01M 50/46* (2021.01)
(52) U.S. Cl.
 CPC ..... *B05C 11/1042* (2013.01); *H01M 10/0585* (2013.01); *H01M 50/46* (2021.01); *Y10T 29/53135* (2015.01)
(58) Field of Classification Search
 USPC .............................. 29/730, 623.1, 623.5, 729
 See application file for complete search history.

(56) References Cited

U.S. PATENT DOCUMENTS

| | | | | |
|---|---|---|---|---|
| 9,793,525 | B2* | 10/2017 | Johnson | ................ H01M 4/621 |
| 2003/0005577 | A1 | 1/2003 | Kitano et al. | |
| 2017/0207476 | A1* | 7/2017 | Suppes | ............... H01M 10/058 |
| 2018/0040865 | A1 | 2/2018 | Lee | |
| 2019/0051924 | A1 | 2/2019 | Kim et al. | |
| 2019/0148761 | A1 | 5/2019 | Lee | |
| 2019/0221811 | A1 | 7/2019 | Kim et al. | |
| 2020/0067050 | A1 | 2/2020 | Kim et al. | |

FOREIGN PATENT DOCUMENTS

| | | |
|---|---|---|
| CN | 110168792 A | 8/2019 |
| ER | 3 460 898 A1 | 3/2019 |
| JP | 2003-77545 A | 3/2003 |
| JP | 2003-515242 A | 4/2003 |
| KR | 10-2014-0062761 A | 5/2014 |
| KR | 10-2016-0049740 A | 5/2016 |
| KR | 10-2016-0094182 A | 8/2016 |
| KR | 10-1667520 B1 | 10/2016 |
| KR | 10-2017-0114351 A | 10/2017 |
| KR | 10-2017-0122030 A | 11/2017 |
| KR | 10-1837724 B1 | 3/2018 |
| KR | 10-2018-0052108 A | 5/2018 |
| KR | 10-2018-0126880 A | 11/2018 |
| KR | 10-2019-0020146 A | 2/2019 |
| KR | 10-1959082 B1 | 3/2019 |

OTHER PUBLICATIONS

International Search Report for PCT/KR2020/009066 (PCT/ISA/210) mailed on Oct. 15, 2020.

* cited by examiner (a)

(b)

(i)

(ii)

(iii)

APPARATUS FOR MANUFACTURING UNIT CELL

CROSS-REFERENCE TO RELATED APPLICATION

The present application claims the benefit of the priority of Korean Patent Application No. 10-2019-0164067, filed on Dec. 10, 2019, which is hereby incorporated by reference in its entirety.

TECHNICAL FIELD

The present invention relates to an apparatus and method for manufacturing a unit cell in which a negative electrode, a separator, and a positive electrode are repeatedly stacked in the predetermined number and order, and more particularly, to an apparatus and method for manufacturing a unit cell, in which a separator is dipped in a solvent to soften a binder, thereby suppress an occurrence of defects due to heat and a pressure.

BACKGROUND ART

Batteries storing electrical energy may be generally classified into primary batteries and a secondary batteries. Such a primary battery is a disposable consumable battery. On the other hand, such a secondary battery is a chargeable battery that is manufactured by using a material in which oxidation and reduction processes between current and the material are capable of being repeated. That is, when the reduction reaction to the material is performed by the current, power is charged. When the oxidation reaction to the material is performed by the current, power is discharged. Such charging-discharging are repeatedly performed to generate electricity.

In general, secondary batteries comprise nickel-cadmium batteries, nickel-hydrogen batteries, lithium ion batteries, and lithium ion polymer batteries. Such a secondary battery is being applied to and used in small-sized products such as digital cameras, P-DVDs, MP3 Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

The lithium secondary battery is generally formed by laminating a positive electrode (i.e., cathode), a separator, and a negative electrode (i.e., anode). Also, materials of the positive electrode, the separator, and the negative electrode may be selected in consideration of battery lifespan, charging/discharging capacities, temperature characteristics, stability, and the like. The charging and discharging of the lithium secondary battery are performed while lithium ions are intercalated and deintercalated from lithium metal oxide of the positive electrode to the negative electrode.

In general, unit cells, each of which has a three-layered structure of a positive electrode/a separator/a negative electrode or a five-layered structure of a positive electrode/a separator/a negative electrode/a separator/a positive electrode or a negative electrode/a separator/a positive electrode/a separator/a negative electrode, are assembled to constitute one electrode assembly. Also, the electrode assembly is accommodated in a case such as a cylindrical can and a prismatic pouch.

Referring to FIG. 1 that illustrates a unit cell manufactured through a method according to the relate art, in the method for manufacturing a unit cell 4 according to the related art, a negative electrode 3 that is cut by a predetermined size is inserted between two sheets of separators 1 that are continuously provided, and then, the stack enters a laminating device 5 in a state in which a positive electrode 2 that is cut by a predetermined size is placed on the upper separator 1. Here, the positions of the positive electrode 2 and the negative electrode 3 may be exchanged with each other, and the positive electrode 2, the negative electrode 3, and the separator 1 may be provided with a greater number of layers.

As described above, when the negative electrode 3, the positive electrode 2, and the separator 1 are put into the laminating device 5 in a stacked state, the stack is pressed while passing through guide rollers 6 mounted inside the laminating device 5 and then is heated using a heater (not shown) mounted inside the laminating device 5 or heated by heating the guide rollers 6. That is, in the laminating apparatus 5, the negative electrode 3, the positive electrode 2, and the separator 1 are heated and pressed at a point at which the negative electrode 3, the positive electrode 2, and the separator 1 contact each other and thus is bonded to each other. Also, after passing through the laminating device 5, cutting is performed to manufacture a unit cell 4.

Here, the applied heat serves to release the cured binder contained in the separator 1, and the applied pressure generates bonding force. However, during the heating and pressing process, there may be a problem that a thickness of the separator 1 unintentionally decreases to adversely affect stability and performance.

DISCLOSURE OF THE INVENTION

Technical Problem

Therefore, a main object of the present invention is to provide an apparatus and method for manufacturing a unit cell, in which a binder is dipped in a solvent to release the separator instead of the process of releasing (softening) the cured binder through the heat according to the related art, thereby preventing the separator from being reduced in thickness.

Technical Solution

In a method for manufacturing a unit cell, in which a negative electrode, a first separator, and a positive electrode are put between guide rollers facing each other in a state of being stacked, wherein one of the positive electrode and the negative electrode, each of which is cut by a predetermined size, is stacked on a top surface of the first separator that is continuously supplied, and an other of the positive electrode and the negative electrode is put to be stacked, according to the present invention for achieving the above object, the first separator is coated with a binder, and the method comprises a solvent dipping step (S10) of dipping the first separator in a solvent to soften a cured binder before the first separator is put between the guide rollers.

A second separator stacked at an outermost layer may be additionally dipped in the solvent, and the solvent may be a solvent containing dimethyl carbonate (DMC), and the binder is softened by the DMC.

The method may further comprises a drying step (S20) of drying the first separator while the first separator passes between the guide rollers, wherein drying of the solvent contained in the first separator may be performed together in the drying step (S20), and the negative electrode and the positive electrode are bonded at surfaces contacting the first separator.

Also, the method may further comprise a collection step (S30) in which the solvent vaporized while passing through the guide rollers is cooled to be collected in a liquid state, and the collected solvent is collected to a reservoir in which the first separator is dipped.

The collection step (S30) may comprise: a negative pressure generation step (S31) for reducing an air pressure within a connection tube having a first end connected to a chamber having the guide rollers and a second end connected to the reservoir to be less than an air pressure the chamber; a cooling step (S32) of cooling the solvent introduced into the chamber to liquefy the solvent; and a draining step (S33) of transferring the liquid solvent to the reservoir.

The solvent dipping step (S10) may comprise a dipping time adjustment step (S11) of adjusting a dipping time of the first separator to adjust an amount of solvent to be absorbed in the first separator.

Also, in the solvent dipping step (S10), only a predetermined region of the first separator may be dipped in the solvent, and remaining portions may not be dipped.

Furthermore, the present invention may additionally provide an apparatus for manufacturing a unit cell, which is capable of manufacturing a unit cell through the method for manufacturing the above-described unit cell.

An apparatus for manufacturing a unit cell, in which one of a positive electrode and a negative electrode is stacked on a top surface of a first separator that is continuously supplied, and an other of the positive electrode and the negative electrode is stacked on a bottom surface of the first separator to bond the positive electrode and the negative electrode to the first separator, according to the present invention comprises: a reservoir in which at least two transfer rollers that rotate while the first separator passes therethrough are mounted, and a solvent is stored at a predetermined level; and a chamber into which the first separator passing through the reservoir is put together with the positive electrode and the negative electrode, each electrode cut by a predetermined size, and guide rollers are disposed so that the negative electrode and the positive electrode move to the top surface and the bottom surface of the first separator, respectively, wherein, while the first separator passes through the reservoir, at least a partial region of the first separator is dipped in the solvent within the reservoir.

Also, drying of the solvent may be performed in the chamber.

The reservoir may comprise: a first reservoir through which the first separator inserted between the positive electrode and the negative electrode passes; and a second reservoir through which a second separator stacked at the outermost layer passes.

Also, the apparatus may further comprises: a connection tube configured to connect one of the first reservoir and the second reservoir to the chamber, wherein the solvent that is dried in the chamber so as to be removed from the first separator may be collected into the first reservoir or the second reservoir through the connection tube.

A cooling device for liquefying the solvent may be coupled to the connection tube.

The first reservoir and the second reservoir may be connected to a through-tube, and a valve may be mounted on the through-tube to supply the solvent between the first reservoir and the second reservoir.

A protrusion of which a diameter partially increases may be disposed along a circumference of at least one transfer roller of the at least two transfer rollers, and only a region of the first separator which passes over the protrusion may be coated with the solvent.

The protrusion may be provided on each of the at least two transfer rollers, and positions of the protrusions may be different from each other for each of the at least two transfer rollers.

Furthermore, an outer circumferential surface of at least one transfer roller of the at least two transfer rollers may be processed to form an unevenness on at least a partial area thereof. Also, a protrusion may be provided on each of the at least two transfer rollers, and the unevenness provided on the outer circumferential surface of one protrusion and the unevenness provided on the outer circumferential surface of the other protrusion may be different from each other.

Also, at least one or more transfer rollers of the transfer rollers may be adjustable in position mounted on the reservoir.

Advantageous Effects

According to the present invention having the above-described configuration, since the binder is dipped in the solvent instead of the manner in which the cured binder is released through the heat, the typical problem in which the thickness of the separator is reduced may be solved.

Also, since the solvent that is vaporized in the chamber is collected into one of the first reservoir or the second reservoir, the waste of the solvent may be prevented, and the first reservoir and the second reservoir may be connected to each other through the through-tube to properly distribute the collected solvent into the first reservoir and the second reservoir.

Furthermore, the protrusion may be provided on each of the transfer rollers mounted on the reservoirs so that the protrusion is dipped in the solvent at only the place passing through the protrusion. Therefore, the separator may be partially dipped in the solvent.

Also, the unevenness may be provided on the protrusion so that the dipping into the solvent is performed at only the convex portion of the surface, and thus, the partial dipping into the solvent may be performed in the more diverse pattern.

Furthermore, at least one or more of the transfer rollers may be provided to be adjustable in mounted position in the reservoir, and thus, the region of the separator, which is dipped in the solvent, may be adjusted to control the dipping time.

MODE FOR CARRYING OUT THE INVENTION

Figure 1:
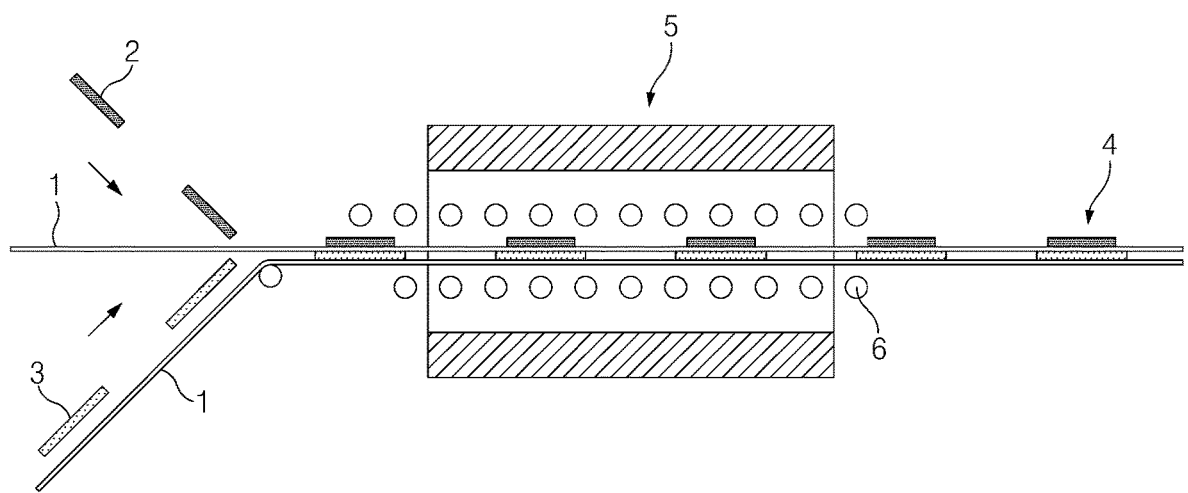
FIG. 1 is a schematic view illustrating a state in which a unit cell is manufactured through a method according to a related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to an apparatus and method for manufacturing a unit cell 4, in which a negative electrode 3, a separator 1, and a positive electrode 2 are put between guide rollers facing each other in a state of being stacked, and also, one of the positive electrode 2 and the negative electrode 3, each of which is cut by a predetermined size, is stacked on a top surface of the separator 1 that is continuously supplied, and the other one is stacked on a bottom surface of the separator 1.

First Embodiment

Figure 2:
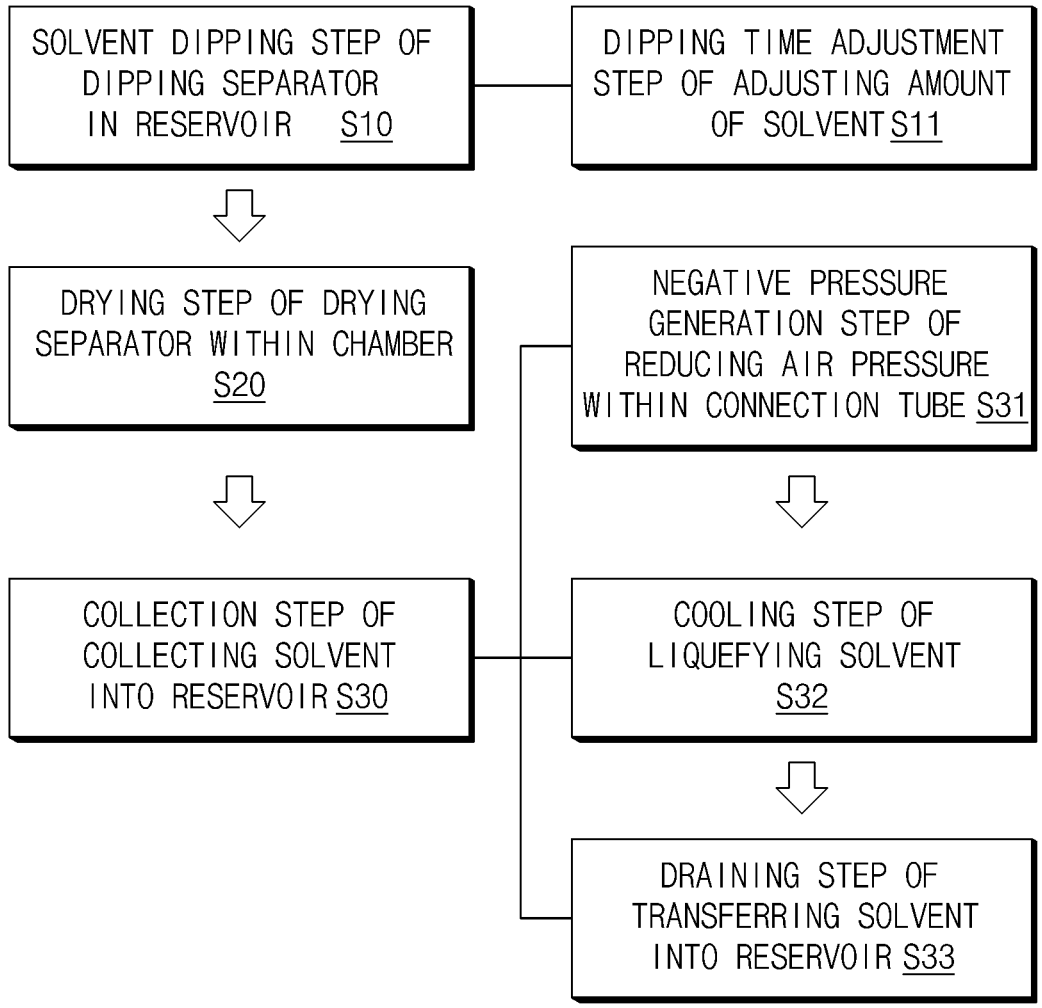
FIG. 2 is a flowchart illustrating each of steps in a method for manufacturing a unit cell according to the present invention.

The present invention provides a method of manufacturing a unit cell as a first embodiment. Referring to FIG. 2, which illustrates a flowchart of steps in a method for manufacturing a unit cell according to the present invention, the manufacturing method according to the present invention comprises a solvent dipping step (S10).

Since a separator 1 provided in the present invention is disposed between a negative electrode 3 and a positive electrode 2 and is additionally disposed at one of the outermost layers, at least two sheets of separators 1 may be continuously supplied. A cured binder contained in the separator 1 may be prepared to be softened by dimethyl carbonate (DMC) contained in a solvent.

In the solvent dipping step (S10), before the separator 1 is put between guide rollers 21 mounted inside a chamber 20, the separator 1 passes through each of reservoirs 10 (10a and 10b) in which a solvent S is stored to be maintained at a predetermined level.

The separator 1 dipped in the solvent S together with the negative electrode 3 and the positive electrode 1 is put between the guide rollers 21 in a state in which the binder is released (softened).

Furthermore, the solvent dipping step (S10) may comprise a dipping time adjustment step (S11) of adjusting a dipping time of the separator 1 to adjust an amount of solvent S to be absorbed in the separator 1. The dipping time of the separator 1 may be adjusted by adjusting a rotation rate of each of the transfer rollers 11, which are mounted on the reservoirs 10 to transfer the separator 1, to adjust a transfer rate of the separator 1 or may be adjusted by adjusting a distance between the transfer rollers 11 to adjust a time for which the separator 1 is dipped in the solvent S.

Also, in the solvent dipping step (S10), only a predetermined region of the separator 1 may be dipped in the solvent S, and remaining portions may not be dipped in the solvent S. That is, only a partial region of the separator 1 may be dipped in the solvent S so that only a portion of the separator 1 is provided in a state of being wetted with the solvent S.

Also, the separator 1 that is wetted with the solvent S is put into the chamber 20 in a state of being stacked with the negative electrode 3 and the positive electrode 2. A drying step (S20) in which the separator 1 is dried while being transferred between the guide rollers 21 within the chamber 20 is performed.

The drying in the drying step (S20) may be performed by a drying device 22 comprising a heater that heats air and a blower that blows heated air into the chamber 20. The high-temperature hot air generated in the drying device 22 may vaporize the solvent without applying an excessive pressure to the separator 1.

Here, the binder contained in the separator 1 is cured by the vaporization of the solvent S, and the negative electrode 3 and the positive electrode 2 are bonded to each other on surfaces thereof contacting each other.

The hot air supplied from the drying device 22 and molecules of the vaporized solvent S are collected into the reservoirs 10 through a connection tube 50 connecting each of the reservoirs 10 to the chamber 20.

Here, since the hot air is additionally introduced from the drying device 22 to the inside of the chamber 20, an air pressure within the chamber 20 may be higher than that of the reservoir 10, and thus, the vaporized solvent S may move toward the reservoir 10 through the connection tube 50. However, since the movement of the solvent S is interrupted depending on heights of both ends of the connection tube 50, an internal temperature, and the like, a negative pressure generation device (not shown) for reducing the air pressure within the connection tube 50 to allow the solvent to forcibly move so that smooth movement is realized may be connected or coupled to the connection tube 50.

Furthermore, a cooling device 51 for liquefying the vaporized solvent so that the solvent S becomes a liquid state before the solvent S that is in the gaseous state reaches the reservoir 10 may be coupled to or additionally mounted on the connection tube 50. Also, when the distance between the reservoir 10 and the chamber 20 is significant, a pump (not shown) for forcibly draining the solvent S may be additionally mounted on the connection tube 50.

Thus, in the collection step (S30) of the present invention, a negative pressure generation step (S31) for reducing the air pressure within the connection tube 50 by the negative pressure generation device may be performed, a cooling step (S32) for liquefying the solvent S by the cooling device 51 may be performed, and a draining step (S33) for forcibly transferring the solvent S to the reservoir 10 by the pump may be performed. However, the negative pressure generation step (S31), the cooling step (S32), and the draining step (S33) may not necessarily need to be comprised in the collection step (S30) and be selectively applied according to constituents of the reservoir 10 and the chamber 20.

Second Embodiment

The present invention provides a manufacturing apparatus capable of manufacturing a unit cell 4 by the manufacturing method according to the first embodiment as a second embodiment. An apparatus for manufacturing a unit cell according to the present invention is configured so that one of a positive electrode 2 and a negative electrode 3, each of which is cut by a predetermined size, is stacked on a top surface of a separator 1 that is continuously supplied, and the other is stacked on a bottom surface of the separator 1 to bond the positive electrode 2 and the negative electrode 3 to the separator 1, thereby manufacturing the unit cell 4.

Figure 3:
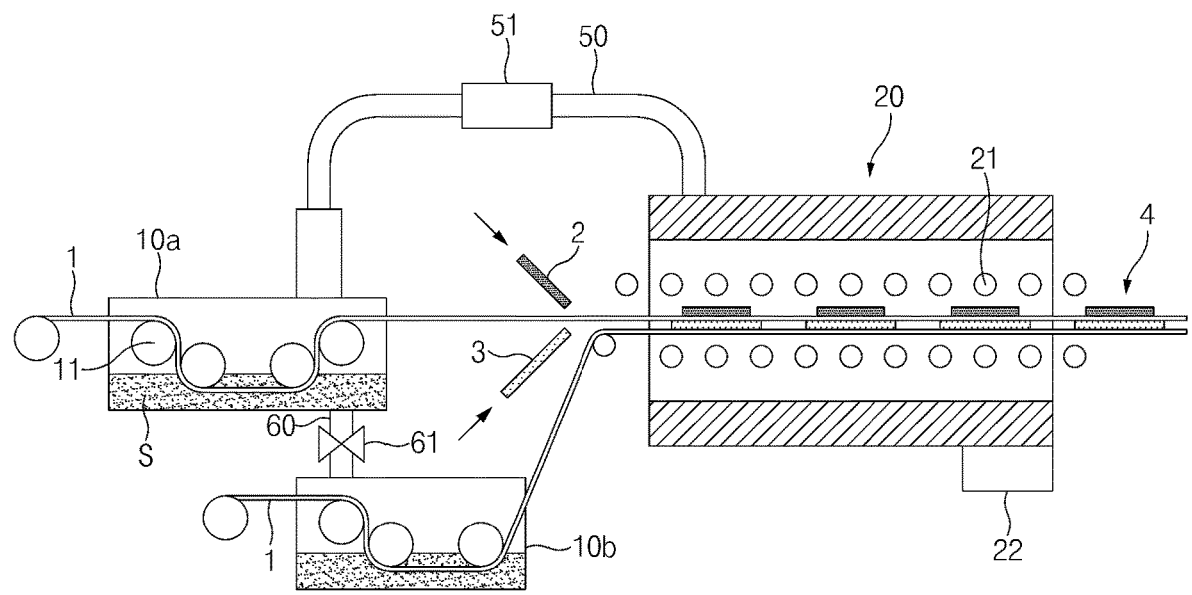
FIG. 3 is a schematic view of an apparatus for manufacturing a unit cell according to the present invention.

As illustrated in FIG. 3 that illustrates a schematic view of the apparatus for manufacturing the unit cell according to the present invention, the manufacturing apparatus of the present invention comprises a reservoir 10 and a chamber 20.

The reservoir 10 is provided with at least two or more transfer rollers 11 that rotate while the separator 1 passes therethrough, and a solvent S is stored at a predetermined level. The level of the solvent S may be monitored in real time by a water level sensor, and the supply of the solvent S may be adjusted to be maintained at a predetermined level.

The reservoir 10 may comprise a first reservoir 10a through which the separator 1 inserted between the positive electrode 2 and the negative electrode 3 passes and a second reservoir 10b through which the separator 1 stacked at the outermost layer except for the separator 1 passing through the first reservoir 10a passes. Here, a third reservoir and a fourth reservoir may be sequentially added according to the number of separators 1 to be inserted.

Furthermore, in the present invention, a protrusion 11b of which a diameter partially increases may be selectively formed along a circumference of at least one of the transfer rollers 11.

Figure 4:
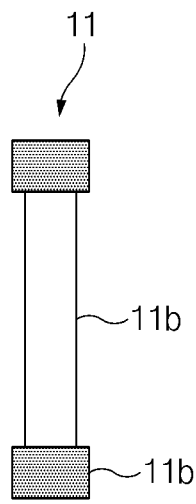
FIG. 4 is a front view (a) of a transfer roller in which a protrusion is disposed on each of both ends and a plan view (b) of a separator that is partially dipped in a solvent by passing through the transfer roller.
Figure 4:
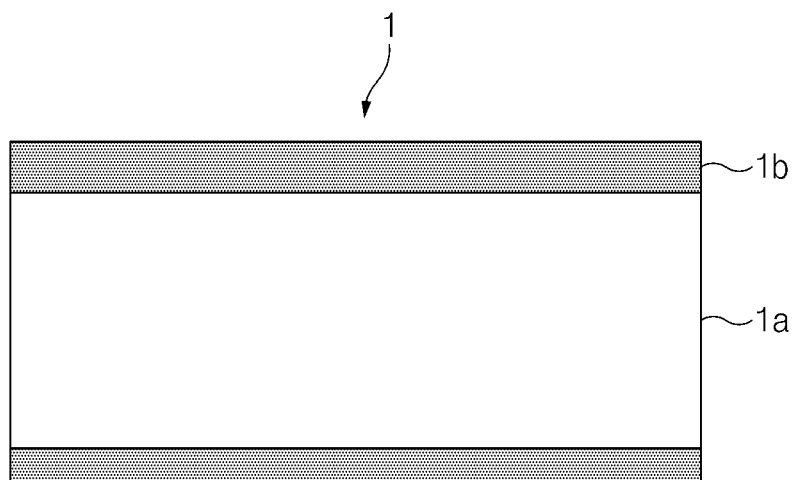
Figure 5:
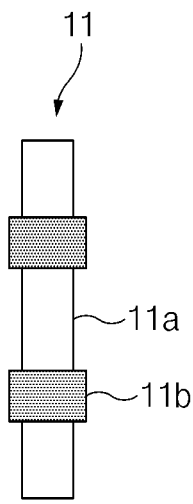
FIG. 5 is a front view (a) of a transfer roller in which a protrusion is disposed to be spaced apart from both ends toward a central portion and a plan view (b) of a separator that is partially dipped in a solvent by passing through the transfer roller.
Figure 5:
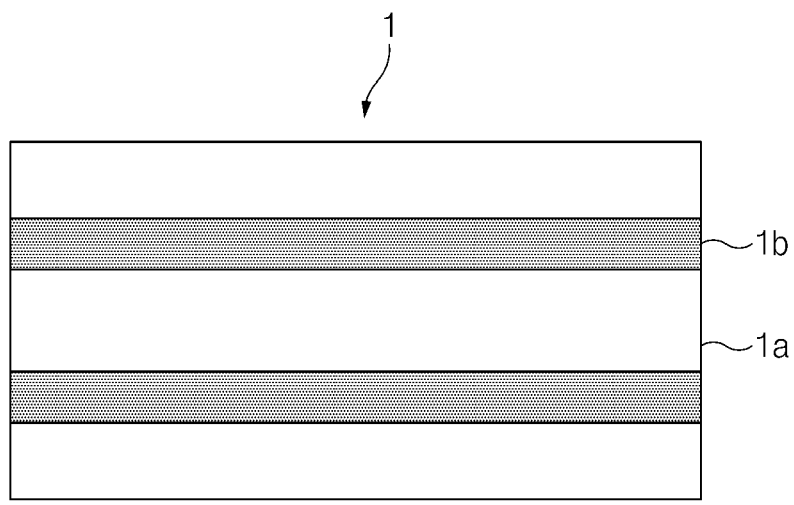

FIG. 4 is a front view (a) of the transfer roller 11 in which the protrusion 11b is disposed on each of both ends and a plan view (b) of the separator 1 that is partially dipped in the solvent S by passing through the transfer roller 11, and FIG. 5 is a front view (a) of the transfer roller 11 in which the protrusion 11b is disposed to be spaced apart from both ends toward a central portion and a plan view (b) of the separator 1 that is partially dipped in the solvent S by passing through the transfer roller 11.

Since the transfer roller 11 has a cylindrical shape, the transfer roller 11 may axially rotate to allow the separator 1 to move. Here, only a region of the separator, which passes over the protrusion 11b having an expanded diameter, may be dipped in the solvent.

That is, as illustrated in FIGS. 4 and 5, the protrusion 11b may be disposed on each of both ends of the transfer roller 11 or may be disposed closer to a center. Here, the level of the solvent S stored in the reservoir 10 may be adjusted, and a height at which the transfer roller is mounted may be adjusted so that the separator 1 is wetted with the solvent S at only a point 1b passing through the protrusion 11b, and the remaining point 1a at which the protrusion 11 does not pass is not wetted with the solvent S. That is, at least a portion of the separator 1 may be dipped in the solvent S within the reservoir 10. For reference, in the drawings, a stepped portion is formed between a portion at which the protrusion 11b is formed and a portion 11b at which the protrusion 11b is not formed. However, the stepped portion is not actually formed, but a gentle slope is formed.

Alternatively, the passing position of the separator 1 may be changed, and thus, only a partial region of the separator 1 may be dipped in the solvent S as described above. That is, only the protrusion 11b below the transfer roller 11 mounted on the reservoir 10 may be dipped in the solvent S, and the rest point 1a may be disposed without being dipped in the solvent S. If the separator 1 passes over the transfer roller 11 in a state of contacting only the protrusion 1ib of the transfer roller 11, since the protrusion 11b rotates at a lower side in the state of being wetted with the solvent S, only the contact point of the separator 1 may be wetted with the solvent S at an upper side. Here, the transfer roller 11 is preferably made of a material capable of absorbing a certain amount of solvent S.

In FIGS. 4 and 5, two protrusions 11b are disposed on the transfer roller 11, but the number and formation position of the protrusions 11b may vary. Also, when the protrusion 11b is formed on the cylindrical transfer roller 11, the protrusion 11b may be manufactured to be integrally provided during the manufacturing of the transfer roller 11.

Alternatively, a separate member having a separable ring shape may be coupled to the transfer roller 11, and thus, the protrusion 11b may be provided to be detachable or adjustable in mounted position and number. In this embodiment, the protrusion 11b may be formed on each of at least two transfer rollers 11 of the transfer rollers 11, and the formed positions of the protrusions 11b may be different from each other for each of the transfer rollers 11.

An outer circumferential surface of the transfer roller 11 may be processed to form unevenness on at least a partial area thereof. For example, when the protrusion 11b is provided, the unevenness may be provided on a surface of the protrusion, which contacts the separator 1. When the protrusion 11b is not provided, and the transfer roller 11 has a cylindrical shape as a whole, the unevenness may be provided on the entire or partial outer circumferential surface of the transfer roller 11.

Also, each of the transfer rollers 11 on which the protrusions 11 are respectively provided may have unevennesses different from each other on the surfaces on the protrusions 11.

As the unevenness is provided on the surface contacting the separator 1 as described above, a surface pressure applied to the separator 1 may vary, and thus, the pattern of the separator 1, which is wetted with the solvent S may have a specific pattern shape according to the shape of the unevenness.

Also, the unevenness may provide a function of more efficiently releasing the binder cured while passing through the transfer roller 1.

Figure 6:
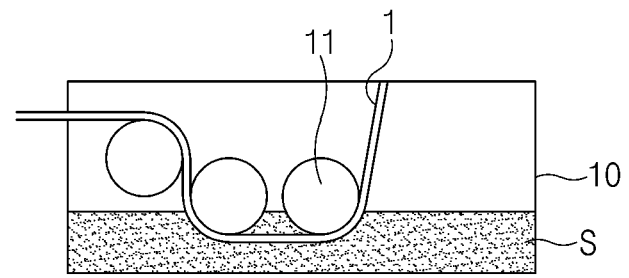
FIG. 6 is a view illustrating a configuration (i) when one of transfer rollers relatively approaches the other transfer roller, a configuration (ii) in which the one transfer roller is spaced apart from the other transfer roller in the state of the configuration (i), and a configuration (iii) in which the one transfer roller is more spaced apart from the other transfer roller in the state of the configuration (ii).
Figure 6:
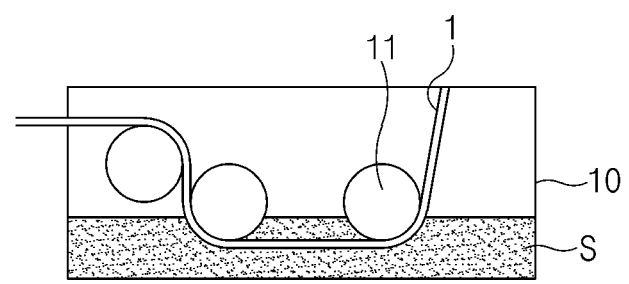
Figure 6:
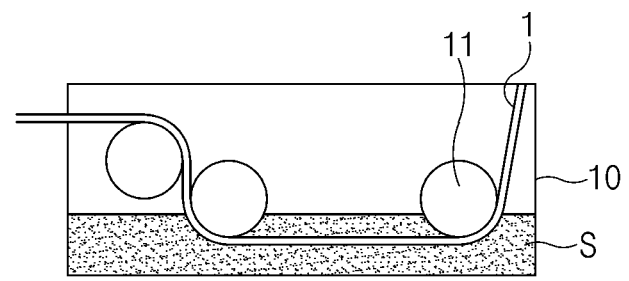

FIG. 6 is a view illustrating a configuration (i) when one of transfer rollers 11 relatively approaches the other transfer roller 11, a configuration (ii) in which the one transfer roller 11 is spaced apart from the other transfer roller 11 in the state of the configuration (i), and a configuration (iii) in which the one transfer roller 11 is more spaced apart from the other transfer roller 11 in the state of the configuration (ii).

In the present invention, at least one or more of the transfer rollers 11 may be configured to be adjustable in position mounted on the reservoir 10. Of course, the moving rate of the separator 1 may increase or decrease by adjusting the axial rotation rate of the transfer rollers 11.

That is, in the present invention, not only an axial rotation rate of the transfer rollers 11 may be adjusted, but also a dipping time during the movement of the separator 1 may be adjusted through adjustment of a distance between the transfer rollers 11.

Also, the first reservoir 10a and the second reservoir in which the transfer rollers 11 are respectively disposed may be connected to each other through a through-tube 60, and a valve 61 may be mounted on the through-tube 60 to supply the solvent S from one place to the other place.

The separators 1 dipped in the solvent S in the first and second reservoirs 10a and 10b are put into the chamber 20 in a state of being stacked with the negative electrode 3 and the positive electrode 2, each of which is cut by a predetermined size. Each of the negative electrode 3 and the positive electrode 2 is put in the state of being cut to correspond to a size of the unit cell 4. Here, the negative electrode 3 and the positive electrode 2 are put in a state of being arranged vertically.

Guide rollers 21 are disposed vertically in the chamber to allow the separator 1, the negative electrode 3, and the positive electrode 2 to move and press the separator 1, the negative electrode 3, and the positive electrode 2 in the stacked direction. While passing through the guide rollers 21, the separators 1 are dried in the chamber 20 to remove the solvent S.

The drying of the separator 1 may be performed by a drying device 22, which is coupled to the chamber and comprises a heater that heats air and a blower that blows heated air into the chamber 20. Alternatively, the drying device 22 may be configured in a manner in which the drying is performed by irradiating infrared rays instead of hot air. That is, the drying may be performed in a manner in which the solvent S is vaporized by irradiating the infrared rays irradiated from an infrared lamp onto the separator to heat the surface of the separator 1.

Here, the binder contained in the separator 1 is cured by the vaporization of the solvent S, and the negative electrode 3 and the positive electrode 2 are bonded to each other on surfaces thereof contacting each other.

The hot air supplied from the drying device 22 and molecules of the vaporized solvent S are collected into the reservoirs 10 through a connection tube 50 connecting each of the reservoirs 10 to the chamber 20. That is, the manufacturing apparatus according to the present invention comprises a connection tube 50 connecting the chamber 20 to either of the first reservoir 10a or the second reservoir 10b.

Also, a cooling device 51 for liquefying the vaporized solvent S may be coupled to the connection tube 50.

Furthermore, a negative pressure generation device for reducing an air pressure within the connection tube 50 and a pump for forcibly draining the solvent S may be additionally connected to the connection tube 50 so that the vaporized solvent S forcibly moves to the reservoir 10.

According to the present invention having the above-described configuration, since the binder is dipped in the solvent S instead of the manner in which the cured binder is released through the heat, the typical problem in which the thickness of the separator 1 is reduced may be solved.

Also, since the solvent S that is vaporized in the chamber 20 is collected into one of the first reservoir 10a or the second reservoir 10b, the waste of the solvent S may be prevented, and the first reservoir 10a and the second reservoir 10b may be connected to each other through the through-tube 50 to properly distribute the collected solvent into the first reservoir 10a and the second reservoir 10b.

Furthermore, the protrusion 11b may be provided on each of the transfer rollers 11 mounted on the reservoirs 10 so that the protrusion 11b is dipped in the solvent S at only the place passing through the protrusion 11b. Therefore, the separator 1 may be partially dipped in the solvent S.

Also, the unevenness may be provided on the protrusion 11b so that the dipping into the solvent S is performed at only the convex portion of the surface, and thus, the partial dipping into the solvent S may be performed in the more diverse pattern.

Furthermore, at least one or more of the transfer rollers 11 may be provided to be adjustable in mounted position in the reservoir 10, and thus, the region in which the separator 1 is dipped in the solvent S may be adjusted to control the dipping time.

While the embodiments of the present invention have been described with reference to the specific embodiments, it will be apparent to those skilled in the art that various changes and modifications may be made without departing from the spirit and scope of the invention as defined in the following claims.

The invention claimed is:

1. An apparatus for manufacturing a unit cell, in which one of a positive electrode and a negative electrode is stacked on a top surface of a first separator that is continuously supplied, and an other of the positive electrode and the negative electrode is stacked on a bottom surface of the first separator to bond the positive electrode and the negative electrode to the first separator, the apparatus comprising:
   a reservoir in which at least two transfer rollers that rotate while the first separator passes therethrough are mounted, and a solvent is stored at a predetermined level; and
   a chamber into which the first separator passing through the reservoir is put together with the positive electrode and the negative electrode, each electrode cut by a predetermined size, and guide rollers are disposed so that the negative electrode and the positive electrode move to the top surface and the bottom surface of the separator, respectively,
   wherein, while the first separator passes through the reservoir, at least a partial region of the first separator is dipped in the solvent within the reservoir.

2. The apparatus of claim 1, wherein drying of the solvent is performed in the chamber.

3. The apparatus of claim 2, wherein the reservoir comprises:
   a first reservoir through which the first separator inserted between the positive electrode and the negative electrode passes; and
   a second reservoir through which a second separator stacked at an outermost layer passes.

4. The apparatus of claim 3, further comprising:
   a connection tube configured to connect one of the first reservoir and the second reservoir to the chamber,
   wherein the solvent that is dried in the chamber so as to be removed from the first separator is collected into the first reservoir or the second reservoir through the connection tube.

5. The apparatus of claim 4, wherein a cooling device for liquefying the solvent is coupled to the connection tube.

6. The apparatus of claim 3, wherein the first reservoir and the second reservoir are connected to a through-tube, and
   a valve is mounted on the through-tube to supply the solvent between the first reservoir and the second reservoir.

7. The apparatus of claim 1, wherein a protrusion of which a diameter partially increases is disposed along a circumference of at least one transfer roller of the at least two transfer rollers, and wherein only a region of the first separator which passes over the protrusion is coated with the solvent.

8. The apparatus of claim 7, wherein the protrusion is provided on each of the at least two transfer rollers, and positions of the protrusions are different from each other for each of the at least two transfer rollers.

9. The apparatus of claim 7, wherein an outer circumferential surface of at least one transfer roller of the at least two transfer rollers is processed to form an unevenness on at least a partial area thereof.

10. The apparatus of claim 9, wherein a protrusion is provided on each of the at least two transfer rollers, and
    wherein the unevenness provided on the outer circumferential surface of one protrusion and the unevenness provided on the outer circumferential surface of the other protrusion are different from each other.

11. The apparatus of claim 1, wherein at least one or more transfer rollers of the transfer rollers are adjustable in position mounted on the reservoir.

* * * * *